United States Patent
Vogt-Birnbrich et al.

[11] Patent Number: 5,854,329
[45] Date of Patent: Dec. 29, 1998

[54] WATER-THINNABLE DISPERSION, A PROCESS FOR PRODUCING IT, AND COATING MEDIA

[75] Inventors: Bettina Vogt-Birnbrich, Solingen; Armin Göbel, Wetter, both of Germany

[73] Assignee: Herberts GmbH, Wuppertal, Germany

[21] Appl. No.: 818,922

[22] Filed: Mar. 17, 1997

[30] Foreign Application Priority Data

Mar. 26, 1996 [DE] Germany ............... 196 11 812.3

[51] Int. Cl.⁶ ........................................... C08J 3/02
[52] U.S. Cl. ..................... 524/457; 524/507; 524/560; 524/591; 524/832; 524/840
[58] Field of Search .................... 524/457, 507, 524/560, 591, 832, 840

[56] References Cited

U.S. PATENT DOCUMENTS 4,318,833  3/1982  Guagliardo .

FOREIGN PATENT DOCUMENTS

| | | |
|---|---|---|
| 0 098 752 | 1/1984 | European Pat. Off. . |
| 0 183 119 | 6/1986 | European Pat. Off. . |
| 0 207 570 | 1/1987 | European Pat. Off. . |
| 0 354 261 | 2/1990 | European Pat. Off. . |
| 0 422 357 | 4/1991 | European Pat. Off. . |
| 0 424 705 | 5/1991 | European Pat. Off. . |
| 0 443 537 | 8/1991 | European Pat. Off. . |
| 0 452 786 | 10/1991 | European Pat. Off. . |
| 0 584 970 | 3/1994 | European Pat. Off. . |
| 44 06 547 | 8/1995 | Germany . |
| 44 15 292 | 11/1995 | Germany . |
| 2 270 916 | 3/1994 | United Kingdom . |
| WO 95/29960 | 11/1995 | WIPO . |

OTHER PUBLICATIONS

1975 Brandrup and Immergut, *Polymer Handbook*, 2nd ed., John Wiley & Sons, N.Y.

*Primary Examiner*—John M. Cooney, Jr.
*Attorney, Agent, or Firm*—Merchant, Gould, Smith, Edell, Welter & Schmidt

[57] ABSTRACT

This invention relates to a water-thinnable dispersion of one or more cationically modified and urethane-modified (meth) acrylic copolymers, which are produced by the solution polymerisation of unsaturated monomers which are polymerisable by a radical mechanism, or of a mixture of such monomers. Coating media based on this dispersion are particularly suitable for the production of base coats in multi-layer coatings, particularly in the coating of vehicles and vehicle parts.

7 Claims, No Drawings

WATER-THINNABLE DISPERSION, A PROCESS FOR PRODUCING IT, AND COATING MEDIA

This invention relates to aqueous dispersions of modified poly(meth)acrylate resins which are suitable for the production of water-thinnable coating media, particularly for the production of base coats in multi-layer coatings. These coating media are preferably employed in the coating of vehicles and vehicle parts.

For environmental reasons, efforts are being made in the vehicle coatings industry, and in other areas of industrial coating also, to avoid a high content of organic solvents in coating media. Coating media have therefore been developed which predominantly contain water as the solvent and dispersing agent, and which only contain small amounts of organic solvents.

In order to impart the requisite water-thinnability to the binder vehicles, they are modified with functional groups capable of forming salts. Conversion into the aqueous phase can be effected after neutralisation of these functional groups. Compared with stabilisation with anionic groups, modification with cationically stabilising groups has the advantage that neutralisation does not necessitate the use of volatile amines which are released again during film formation.

Cationically stabilised coating media of this type are known. Thus, for example, EP-A-0 452 786 describes aqueous base lacquers which are based on cationically modified (meth)acrylate, polyester, polyurethane or polyurethane-urea resins. These binder vehicles can also be used in combination. However, incompatibilities arise in binder vehicle combinations of this type, e.g. in combinations of polyurethane and poly(meth)acrylate resins, and the these incompatibilities result in a lack of bonding between coats and in a lack of elasticity in coatings produced from these binder vehicles.

EP-A-0 183 119 describes cationically and anionically modified binder vehicles which are obtained by the emulsion polymerisation of ethylenically unsaturated monomers in the presence of an aqueous dispersion of oligourethanes which contain ionisable groups, preferably carboxyl groups, and unsaturated terminal groups. These binder vehicles can be used in water-thinnable lacquers.

EP-A-0 98 752 discloses water-thinnable polyurethane dispersions containing cationic or anionic groups in their macromolecule. These are produced by emulsion polymerisation, in that, in a first step, a mixture comprising a diol containing groups which can be converted into anionic or cationic groups and a macroglycol is reacted with an excess of diisocyanate, the NCO prepolymer which is thus obtained is reacted with a hydroxyalkyl ester of acrylic acid or methacrylic acid, the oligourethane is subjected to a salt formation step, and is subsequently polymerised in aqueous dispersion in the presence of unsaturated monomers.

The disadvantages of the polyurethane dispersions cited in both these aforementioned patent applications are their poor pigment wetting properties in lacquer formulations, and thus an unsatisfactory stability of the finished coating medium. In addition, the high molecular weights of the emulsion polymers have a negative effect on film formation.

The object of the present invention was therefore to provide cationically modified binder vehicles which exhibit good compatibility with other binder vehicles and which result in stable, water-thinnable dispersions. They should be suitable for water-thinnable coating media which are characterised by good film formation, satisfactory pigment stability and good bonding between coats in a multi-layer coating, and in addition should result in a good metallic effect.

This object is achieved by water-thinnable dispersions of one or more cationically modified and urethane-modified (meth)acrylic copolymers, which are obtained by the solution polymerisation of A) unsaturated monomers which are polymerisable by a radical mechanism, or a mixture of unsaturated monomers which are polymerisable by a radical mechanism, which are optionally modified with cationic groups or groups which can be converted into cationic groups, in the presence of B) one or more polyurethane macromonomers containing unsaturated groups, wherein the polyurethane macromonomer is obtained by the reaction of b1) one or more mono- and/or polyhydroxyl compounds, which optionally contain polymerisable double bonds, with b2) one or more polyisocyanates, b3) optionally with a compound which contains, in its molecule, at least one group which is reactive towards isocyanate groups and at least one group which is capable of forming cations, or with a mixture of such compounds, b4) optionally with a compound which in addition to a polymerisable double bond contains at least one group which is reactive towards NCO groups, or with a mixture of such compounds, and b5) optionally with a compound which contains a group which is reactive towards isocyanate groups and contains a linear or branched (cyclo)aliphatic hydrocarbon radical containing 5 to 20 C atoms, or with a mixture of such compounds, wherein components b) to b5) are selected so that a polyurethane macromonomer is formed which contains terminal and/or lateral unsaturated groups and the cationic groups or groups which can be converted into cationic groups of the urethane-modified (meth)acrylic copolymer are introduced via unsaturated monomers A), which are polymerisable by a radical mechanism, and/or via polyurethane macromonomer B).

The term "(meth)acrylic" is to be understood here and hereinafter to represent acrylic and/or methacrylic, and the term "(cyclo)aliphatic" is to be understood to represent aliphatic and/or cycloaliphatic. The term "polyurethane macromonomer" is to be understood to represent polyurethane oligomers which contain polymerisable groups.

The present invention also relates to water-thinnable coating media containing

C) water-thinnable dispersions of one or more of the aforementioned (meth)acrylic copolymers (the reaction product of A) and B)) which are urethane-modified and which are modified with cationic groups or groups which can be converted into cationic groups, optionally in combination with other water-thinnable cationically modified binder vehicles, D) water, and E) optionally organic solvents, pigments and/or extenders, as well as customary lacquer additives.

The dispersions and urethane-modified (meth)acrylic copolymers according to the invention are produced by placing polyurethane macromonomers containing unsaturated groups in a vessel, optionally in an organic solvent or solvent mixture, and by polymerising unsaturated monomers which are polymerisable by a radical mechanism, or a mixture of unsaturated monomers which are polymerisable by a radical mechanism, in the presence of these polyurethane macromonomers. During polymerisation, copolymers are formed from the unsaturated polyurethane macromonomers and the unsaturated monomers which are polymerisable by a radical mechanism. Grafting reactions between the polyurethane macromonomer and the unsaturated monomers may also occur during polymerisation. The reaction product of A) and B) which is obtained is subsequently neutralised and is converted into an aqueous dispersion.

60 to 95% by weight of the unsaturated monomers which are polymerisable by a radical mechanism is preferably polymerised in 5 to 40% by weight of polyurethane macromonomer, where the percentages by weight are given with respect to the solids content and add up to 100%. Practically all ethylenically unsaturated monomers which are commonly employed for polymerisation by a radical mechanism are suitable as monomers which are polymerisable by a radical mechanism, such as those which correspond to the Q- and e-scheme of copolymerisation according to Alfrey and Price, for example (see Brandrup and Immergut, Polymer Handbuch, 2nd Edition, John Wiley and Sons, New York 1975).

Unsaturated monomers containing functional groups can be used, e.g. those containing hydroxyl groups, glycidyl groups, amino groups and ether groups, as well as customary unsaturated monomers without other functional groups.

Hydroxyalkyl esters or hydroxyaryl esters of unsaturated carboxylic acids are examples of olefinically unsaturated monomers containing hydroxyl groups. Hydroxyalkyl esters of acrylic acid or methacrylic acid with aliphatic diols containing 2 to 20 C atoms are preferred. Examples of hydroxyalkyl esters of this type which contain a primary hydroxyl group include hydroxyethyl (meth)acrylate, hydroxypropyl (meth)acrylate, hydroxybutyl (meth) acrylate, hydroxyamyl (meth)acrylate, neopentyl glycol monoacrylate, hydroxyhexyl (meth)acrylate and hydroxyoctyl (meth)acrylate. Examples of hydroxyalkyl esters containing a secondary hydroxyl group include 2-hydroxypropyl (meth)acrylate, 2-hydroxybutyl (meth) acrylate and 3-hydroxybutyl (meth)acrylate. The corresponding esters of other unsaturated carboxylic acids may also be used, however, such as those of crotonic acid or of isocrotonic acid for example.

Hydroxyalkylamides of unsaturated carboxylic acids, e.g. of acrylic acid, methacrylic acid and fumaric acid, are a further group of OH-functional monomers. Examples thereof include N-hydroxyethylmethacrylic acid amide, N-(2-hydroxypropyl)-methacrylamide or N-hydroxyalkylfumaric acid mono- or diamide. Compounds which are also very suitable include the reaction products of one mole of hydroxyalkyl (meth)acrylate and 2 moles of epsilon-caprolactone, as well as addition compounds of (meth)acrylic acid and glycidyl esters of saturated alpha, alpha-dialkylalkane-monocarboxylic acids, for example glycidyl esters of versatic acid.

Other unsaturated compounds which contain hydroxyl groups include allyl alcohol, monovinyl ethers of polyalcohols, particularly those of diols such as the monovinyl ethers of ethylene glycol or butanediol, allyl ethers or esters which contain hydroxyl groups, such as 2,3-dihydroxypropyl monoallyl ether, trimethylolpropane monoallyl ether or 2,3-dihydroxypropionic acid allyl ester, as well as glycerol mono(meth)acrylate.

Hydroxyethyl (meth)acrylate, hydroxypropyl (meth) acrylate and hydroxybutyl (meth)acrylate are particularly suitable.

Examples of suitable unsaturated monomers without other functional groups include esters of unsaturated monocarboxylic acids with aliphatic, monohydric, branched or unbranched or cyclic alcohols containing 1 to 20 C atoms. These are preferably esters of acrylic acid or methacrylic acid. Examples of esters with aliphatic alcohols include methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of esters with cyclic alcohols include cyclohexyl (meth)acrylate, trimethylcyclohexyl (meth)acrylate, 4-tert.-butylcyclohexyl (meth)-acrylate and isobornyl (meth)acrylate.

Examples of other unsaturated monomers include styrene, alpha-methylstyrene, and vinyl esters such as vinyl acetate. Ethylenically polyunsaturated monomers can also be used, however. These are monomers containing at least 2 double bonds which are polymerisable by a radical mechanism. Examples thereof include divinylbenzene, 1,4-butanediol diacrylate, 1,6-hexanediol diacrylate, neopentyl glycol dimethacrylate and glycerol dimethacrylate.

If the groups which are to be converted into cationic groups are to be introduced into the reaction product of A) and B) by way of the monomers which are polymerisable by a radical mechanism, corresponding unsaturated monomers containing basic groups should be used. Unsaturated monomers containing amino groups are preferred in this respect. Monomers containing onium groups may also be used, however.

For example, monomers of general formula

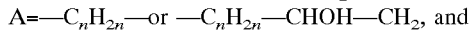

can be used as monomers containing amino groups, where

R=—R' or —X—$C_nH_{2n}$,

R'=—H or —$C_nH_{2n+1}$ and

R"=—R', —$C_nH_{2n}$OH and/or —$C_nH_{2n+1}$, $NR_2$, where R is as defined above, X=—COO—, —CONH—, —$CH_2$O— or —O—, A=—$C_nH_{2n}$—or —$C_nH_{2n}$—CHOH—$CH_2$, and n=1 to 8, preferably 1 to 3.

Examples of unsaturated monomers containing N groups include N-dialkyl or N-monoalkylaminoalkyl (meth) acrylates or the corresponding N-alkanol compounds, such as N-diethylaminoethyl acrylate or n-tert.-butylaminoethyl acrylate, N-dialkyl- or N-monoalkylaminoalkyl( meth) acrylamide for example, or the corresponding N-alkanol compounds, such as N-dimethylaminoethanol acrylamide and/or heterocyclic compounds which contain vinyl groups and which contain one or more basic nitrogen atoms, such as N-vinyl imidazole for example.

Polyurethane macromonomer B) preferably has a number average molecular weight Mn of 2000–20000, most preferably of 3000–8000, and contains, as a statistical average, 0.2–1.5, preferably 0.8–1.1 polymerisable double bonds per molecule. The polyurethane macromonomer preferably has an amine number of 0–100, most preferably 30–70 mg KOH/g and an OH number of 0–150 mg KOH/g. The type and amount of starting compounds are selected according to the desired amine and OH numbers.

The polyurethane macromonomer can be prepared by the simultaneous reaction of all the starting compounds in solution or in the melt. It is also possible to prepare the macromonomer by a step-wise procedure, however.

Saturated and/or unsaturated polyhydroxypolyesters, polyhydroxypolyethers, polyhydroxypolycarbonates, polyhydroxy-polyurethanes, polyhydroxypolybutadienes, polyhydroxy-polyacrylates and polyhydroxycarboxylic acids can be used as component b1). These compounds are preferably dihydroxy compounds, preferably with a hydroxyl number of 25–200, most preferably 40–150 mg KOH/g.

The polyester diols are preferably produced by the esterification of organic dicarboxylic acids, or anhydrides thereof, with organic diols, or are derived from a hydroxycarboxylic acid or from a lactone. The dicarboxylic acids and diols may be linear or branched aliphatic, cycloaliphatic or aromatic dicarboxylic acids or diols. Linear, unbranched polyesters are preferably produced. The diols may be alkylene glycols for example, such as ethylene glycol, propylene glycol, butylene glycol, 1,4-butanediol, 1,6-hexanediol and neopentyl glycol for example, and other diols such as dimethylolcyclohexane. Polyols containing more than 2 hydroxyl groups may also be used, however, such as trimethylolpropane, glycerol or pentaerythritol. Suitable acids are low molecular weight dicarboxylic acids, or anhydrides thereof, containing 2–18 C atoms in their molecule, for example. Examples of suitable acids include phthalic acid, isophthalic acid, o-phthalic acid, terephthalic acid, tetrahydrophthalic acid, hexahydrophthalic acid, succinic acid, azelaic acid, sebacic acid, itaconic acid, adipic acid, maleic acid, fumaric acid, glutaric acid and trimellitic acid. The corresponding anhydrides may also be used.

Polyhydroxypolyesters derived from lactones may also be used. These compounds are obtained, for example, by the reaction of a lactone with a polyol. Epsilon-caprolactone is the most preferred lactone. Examples of polyols which are suitable for this reaction include ethylene glycol, 1,3-propanediol, 1,4-butanediol, 1,6-hexanediol, trimethylolpropane and pentaerythritol.

Compounds of general formula

are suitable as polyhydroxypolyethers, where R is hydrogen or a lower alkyl radical, optionally with different substituents, n is an integer from 2–6 and m is a number from 400–5000. Examples thereof include poly(oxytetramethylene) glycols, poly(oxy-ethylene) glycols and poly(oxypropylene) glycols.

Polycarbonate polyols may also be used as polyhydroxy compounds b1). These OH-functional polycarbonates can be produced by the reaction of polyols, such as 1,3-propanediol, 1,4-butanediol, 1,6-hexanediol, diethylene glycol, triethylene glycol, 1,4-bishydroxymethylcyclohexane, neopentyl glycol, trimethylolpropane or pentaerythritol, with dicarbonates such as dimethyl, diethyl or diphenyl carbonates, or phosgene.

Proportions of low molecular weight polyols, with a molecular weight of 90–350 for example, may also be used as polyhydroxy compounds b1). Examples thereof include ethylene glycol, butylene glycol, neopentyl glycol, 1,4-butanediol, 1,6-hexanediol, dimethylolpropane and hydroxyethylated or hydroxypropylated bisphenol A or bisphenol F.

Polyhydroxy compounds b1) may be used individually or in admixture.

If polymerisable double bonds are to be introduced into the polyurethane macromonomer by way of component b1), compounds which contain polymerisable double bonds then have to be used as a1), i.e. a proportion of the corresponding polyester diols has to be produced from polyols and/or polycarboxylic acids containing polymerisable double bonds. Examples of polyols which contain a polymerisable double bond include trimethylolpropane monoallyl ether, glycerol monoallyl ether and pentaerythritol monoallyl ether. Alkene dicarboxylic acids and maleic acid are examples of polycarboxylic acids containing polymerisable unsaturated groups. The reaction products of carboxylic anhydrides with long chain olefines may also be used. Examples thereof include the reaction products of maleic anhydride with olefines containing 6–20 C -atoms, such as the reaction product of maleic anhydride with dodecene for example.

Customary aliphatic, cycloaliphatic and/or aromatic polyisocyanates can be used as component b2). The polyisocyanates may also be sterically hindered. Examples of aliphatic polyisocyanates include trimethylene diisocyanate, propylene diisocyanate, tetramethylene diisocyanate, pentamethylene diisocyanate, hexamethylene diisocyanate, 1,1,6,6-tetramethylhexamethylene diisocyanate, and p- or m-tetramethylxylylene diisocyanate. Examples of cycloaliphatic polyisocyanates include isophorone diisocyanate, dicyclohexylmethane diisocyanate and 3-isocyanatomethyl-1-methylcyclohexyl isocyanate. Examples of aromatic polyisocyanates, which are less preferred, include 1,3- and 1,4-phenylene diisocyanate, xylylene diisocyanate, diphenylmethyl diisocyanate and toluene diisocyanate. In addition to diisocyanates, proportions of polyisocyanates of higher functionality, e.g. triisocyanates, may also be used. Examples thereof include triisocyanates which are obtained by the trimerisation of diisocyanates, or those obtained by the reaction of diisocyanates with polyfunctional compounds containing OH or NH groups, such as the isocyanurate of hexamethylene diisocyanate or the addition compound of isophorone diisocyanate and trimethylolpropane.

Component b3) serves for the introduction of groups which are capable of forming cations into the polyurethane macromonomer. The amount of component b4) results from the amine number aimed at. Suitable groups which are reactive towards isocyanate include hydroxyl groups in particular. Suitable groups which are capable of forming cations include primary, secondary and tertiary amino groups, and/or onium groups such as quaternary ammonium groups, quaternary phosphonium groups and/or tertiary sulphonium groups. Dialkylamino groups are preferred. Examples of component a3) include low molecular weight aliphatic diols such as N-alkyl-dialkylanolamines, wherein aliphatic or cycloaliphatic radicals containing 1–10 C atoms are used as the alkyl or alkane radical. The alkyl group may be a methyl, ethyl, butyl or cyclohexyl group, for example. The alkanol radical consists of ethanol, isopropanol, butanol or cyclohexanol, for example. Suitable examples include N-methyldiethanolamine, N-methyldiisopropylamine, 1,2-propanediol-3-dimethylamine and 2-diethylamino- 1,2-propanediol.

Component b4) essentially serves for the introduction of polymerisable double bonds into the polyurethane macromonomer. For this purpose, compounds are used which, in addition to a polymerisable double bond, also contain at least one group which is reactive towards NCO groups. Examples of reactive groups such as these include —OH, —SH, —NH and $NH_2$ groups, for example. Macromonomers containing lateral and/or terminal vinyl groups can be produced, i.e. vinyl groups which are attached at the start or end of the polymer chain are obtained when unsaturated monomers containing a group which is reactive towards isocyanate groups are incorporated. Examples thereof include the reaction products of monoepoxides and alpha,beta-unsaturated carboxylic acids, such as the reaction products of versatic acid glycidyl ester and (meth)acrylic acid, for instance, or the reaction products of alpha,beta-unsaturated glycidyl esters or ethers with monocarboxylic acids, for example the reaction products of glycidyl methacrylate and stearic acid or linseed fatty acid, and also (meth)acrylates with primary or secondary amino groups.

Compounds which are also very suitable in this respect include hydroxyalkyl (meth)acrylates, such as hydroxyethyl, hydroxypropyl, hydroxybutyl and hydroxyhexyl (meth)acrylates.

Macromonomers containing lateral vinyl groups, i.e. vinyl groups which are not attached at the start or end of the chain but which are incorporated therebetween, are obtained when unsaturated monomers containing at least two groups which are reactive towards isocyanate groups are incorporated. Examples of monomers such as these include trimethylolpropane derivatives, such as trimethylolpropane monoallyl ether or trimethylolpropane mono(meth)acrylate for example, or addition products of alpha,beta-unsaturated carboxylic acids such as (meth)acrylic acid, with diepoxides, e.g. bisphenol A diglycidyl ether or hexanediol diglycidyl ether, addition compounds of dicarboxylic acids, such as adipic acid, terephthalic acid or the like, for example, with (meth)acrylic acid diglycidyl ester and monovinyl ethers of polyols, e.g. glycerol monoallyl ether or pentaerythritol monoallyl ether. Compounds which are also very suitable include dihydroxyalkyl esters of (meth)acrylic acid, such as 2,3-dihydroxypropyl (meth)acrylate and compounds such as glycerol mono(meth)acrylate or pentaerythritol mono(meth)acrylate for example.

Hydrophobic constituents can additionally be introduced into the polyurethane macromonomer with component b5). This is effected by incorporating terminal aliphatic chains into the polyurethane macromonomer by means of a compound which contains a group which is reactive towards isocyanate groups and which contains a linear or branched (cyclo)aliphatic hydrocarbon radical comprising 5–30 C atoms, preferably 8–16 C atoms. Primary or secondary hydroxyl groups or a secondary amino group are suitable as groups which are reactive towards isocyanate. Long chain mono fatty alcohols and/or mono fatty amines are preferably used. Examples thereof include n-hexyl alcohol, n- or iso-octyl alcohol, isononanol, lauryl alcohol, cetyl alcohol, stearyl alcohol, ceryl alcohol, n-hexylamine, n-octylamine and laurylamine. Mixtures of the said alcohols and amines may also be used.

The radical-induced polymerisation of unsaturated monomers A) in the polyurethane macromonomer B) is conducted as a radical-induced solution polymerisation, as is customary in the prior art. This is effected at temperatures of 80°–150° C., for example. In this respect, all solvents which are customary for solution polymerisation can be used. Organic solvents which are miscible with water are preferably used, however, for example glycols such as butyl glycol, ethylene glycol, propylene glycol, or glycol ethers or esters, such as diethylene glycol dialkyl ethers, dipropylene glycol dialkyl ethers or glycol ethers of ethylene and propylene glycol, alcohols such as 2-methoxypropanol, ethoxypropanol, n-butanol, n-propanol, and ketones such as acetone, methyl ethyl ketone, diethyl ketone or methyl isobutyl ketone.

The polymerisation reaction can be initiated with known polymerisation initiators.

Examples of initiators which are preferably used for polymerisation include: dialkyl peroxides such as di-tert.-butyl peroxide or di-cumyl peroxide; diacyl peroxides such as dibenzoyl peroxide or dilauroyl peroxide, peresters such as tert.-butyl perbenzoate or tert.-butyl perpivalate, hydroperoxides such as cumene hydroperoxide, azo compounds such as azo-bis-cyclohexane-carbonitrile or azo-bis-isobutyronitrile.

Polymerisation of unsaturated monomers A) in the presence of polyurethane macromonomer B) is followed by the conversion of the reaction product of A) and B) into an aqueous dispersion. For this purpose, the groups which are contained in the reaction product and which are capable of forming cations are completely or partially neutralised with acids before or during the conversion into the aqueous phase. Organic monocarboxylic acids are examples of suitable acids. Examples thereof include formic acid, acetic acid and propionic acid. Acids which are also very suitable include hydroxycarboxylic acids, such as lactic acid, glycolic acid, malic acid, ascorbic acid, citric acid, mandelic acid, tartaric acid, hydroxypropionic acid and dimethylolpropionic acid.

Neutralisation with non-volatile acids is particularly advantageous. The acids remain in the lacquer film and are not released into the environment during film formation. Although the use of non-volatile neutralising agents is not considered to be advantageous due to the resultant hydrophilic impurities in the lacquer film, no negative effects could be detected when non-volatile acids were used. Dimethylolpropionic acid is preferably used as the non-volatile acid.

The content of groups which are capable of forming cations in the urethane-modified (meth)acrylic copolymer (the reaction product produced from components A) and B)) should preferably result in an amine number of 10–100, most preferably 20–80 mg KOH/g. In this connection, the groups which are capable of forming cations may be contained exclusively in component A), or exclusively in component B), or in both components.

The urethane-modified (meth)acrylic copolymer has an OH number of 0–200, preferably of 20–120, most preferably of 40–100 mg KOH/g, and preferably has a number average molecular weight of 3000–500,000, most preferably 10,000–100,000.

The urethane-modified (meth)acrylic copolymer contains 5–99% by weight, preferably 25–95% by weight, most preferably 50–90% by weight, of unsaturated monomers A) which are polymerisable by a radical mechanism, and contains 95–1% by weight, preferably 75–5% by weight, most preferably 50–10% by weight, of polyurethane macromonomer B).

After the formation of the dispersion, the solvents which the latter optionally contains can be removed. The dispersions according to the invention which are obtained preferably have a solids content of 25–50% by weight. They are dispersions which are stable on storage and which exhibit good compatibility with other binder vehicles, for example with other cationically modified binder vehicles.

Water-thinnable coating media can be produced from the dispersions of urethane-modified (meth)acrylic copolymers according to the invention. Pigments, extenders, additives, and optionally other binder vehicles and small amounts of solvents may be added to the dispersions for this purpose, for example.

The other binder vehicles which are optionally present in the coating medium may be cationically modified poly(meth)acrylate and/or polyurethane and/or polyester resins, for example. Resin components of this type are described in EP-A-0 452 786, for example. Cationically modified acrylated polyurethanes which are produced by emulsion polymerisation, such as those described in EP-A-0 98 752 and EP-A-0 183 119, for example, are also suitable as other binder vehicle components which may optionally be present. However, non-ionic stabilised binder vehicles, for example those comprising incorporated polyether segments, can also be used in addition.

Examples thereof include polyurethane or polyurethane acrylate resins such as those described in EP-A-0 354 261, EP-A-0 422 357 and EP-A-0 424 705.

The coating media produced from the binder vehicle dispersions according to the invention may contain various crosslinking agents, for example formaldehyde condensation resins such as phenol-formaldehyde condensation resins and amine-formaldehyde condensation resins, as well as blocked and unblocked polyisocyanates. The crosslinking agents may be used individually or in admixture.

These are crosslinking agents which are customary in the lacquer industry, which are extensively described in the literature and which are commercially available.

The coating media may contain customary inorganic and/or organic colouring pigments and/or extenders, as well as transparent pigments. Examples of inorganic or organic colouring pigments or extenders include titanium dioxide, micronised titanium dioxide, iron oxide pigments, carbon black, silica, barium sulphate, micronised mica, french chalk, azo pigments, phthalocyanine pigments, and quinacridone or pyrrolopyrrole pigments.

The coating media may also contain effect pigments. Effect pigments are characterised in particular by their lamellar structure. Examples of effect pigments include: metallic pigments, e.g. of aluminium, copper or other metals; interference pigments such as metallic pigments coated with metal oxides, e.g. aluminium coated with titanium oxide or coated with mixed oxides; coated mica, such as titania-coated mica for example; and graphite effect pigments.

The coating media may also contain lacquer technology additives, for example rheology-influencing agents such as microdispersed hydrated silica, layer silicates or polymeric urea compounds. Examples of substances which act as thickeners also include water-soluble cellulose ethers, as well as synthetic polymers containing ionic groups or groups with an associative action such as modified ethoxylated polyurethanes or polyacrylates, and polypeptides. In addition, anti-settling agents, levelling agents, light stabilisers, anti-foaming agents such as compounds containing silicones for example, wetting agents and substances which promote bonding can also be used. Catalysts may optionally be used to speed up hardening.

The usual industrial lacquer solvents are suitable as solvents present in small amounts. These may stem from the production of the binder vehicle or may be added separately.

Examples of solvents such as these include the organic solvents which have already been cited above in the description of the solution polymerisation.

The coating media according to the invention can be produced by methods known in the art. The solids content, pH and viscosity of the coating medium are adjusted in the usual manner if necessary.

The coating media according to the invention are particularly suitable for the production of coating media for colour-imparting and/or effect-imparting base coats in a multi-layer coating. However, it is also possible to produce other coating media from them, e.g. primer coats, primer surfacers, or clear lacquers. In this connection, the selection of the pigments and additives and the concentration thereof is matched to the respective purpose of use.

Depending on the choice of crosslinking agent, the coating media produced from the binder vehicle dispersions according to the invention can be formulated as physically drying or crosslinking single-component or two-component systems.

The water-thinnable coating media produced from the binder vehicle dispersions according to the invention may be produced by making up a basic formulation or by means of a modular system as described in German Application DE-A-44 15 292.

The present invention also relates to a process for producing a multi-layer coating, in which a coloured base lacquer coat comprising the coating medium according to the invention is applied to a substrate which is optionally pre-coated. A clear lacquer coat can be applied to this base lacquer coat, either after drying or hardening or wet-into-wet, optionally after a brief ventilation aeration step. In principle, all known non-pigmented or transparent coating media are suitable as the clear lacquer. After their application, the clear lacquer and base lacquer coats are dried or hardened, preferably jointly. This is effected at temperatures of 20°–150° C. for example. Temperatures of 20°–80° C. are preferred for repair coatings, and temperatures above 100° C. are preferred for mass production coating operations. Application is effected by the usual methods, preferably by spraying.

One preferred area of application of the coating media produced from the binder vehicle dispersions according to the invention is the coating of vehicles and of vehicle parts. The coating media can be employed both for the coating of vehicles for repair purposes and for the mass production coating of vehicles.

Metal and plastics substrates are suitable as substrates, particularly the substrates which are known in the automobile industry, e.g. steel, zinc, aluminium, magnesium or alloys thereof, as well as polyurethanes, polycarbonates or polyolefines. However, the coating media are also suitable for the coating of other substrates, such as glass, concrete or wood.

Coating media formulated with the binder vehicle dispersions according to the invention are characterised by good wetting of pigments and a good stability on storage. In the production of multi-layer coatings the coating media exhibit good bonding between coats. A good metallic effect is obtained when metallic lacquers are formulated.

The invention is explained in more detail in the following examples. All data is given with respect to weight.

1st Example 1.1 Preparation of a PUR macromonomer with an amine number of 70

| | | |
|---|---|---|
| 1. | 13.063 parts | of a polyester consisting of hexanediol, adipic acid and isophthalic acid hydroxyl number 100 acid number < 3 mg KOH/g |
| 2. | 6.154 parts | methyldiethanolamine |
| 3. | 1.758 parts | hydroxyethyl methacrylate |
| 4. | 2.630 parts | lauryl alcohol |
| 5. | 0.407 parts | BHT stabiliser KB |
| 6. | 17.070 parts | isophorone diisocyanate |
| 7. | 58.918 parts | ethoxypropanol |
| | 100.000 | |

Items 1 to 5 were weighed in succession into a clean, dry reaction vessel with a flat ground joint, which was fitted with a lid, stirrer, thermometer and reflux condenser. The mixture was heated to 45°–50° C. with stirring, and was subsequently stirred for a further 1 hour at this temperature to achieve better mixing.

Item 6 had to be added in portions, so that on the onset of an exothermic reaction a maximum product temperature of 85° C. was not exceeded. After the addition was complete, the batch was maintained at a reaction temperature of 80° C. until a determination of the isocyanate groups gave a value<0.3%.

In order to determine the characteristic number, the amino groups present in the resin had to be taken into account in the calculation of the isocyanate group determination according to DIN 53 185. A parallel determination of the amine number according to DIN 53 176 was necessary for this reason.

After the said isocyanate number was reached, the batch was diluted at 80° C. with item 7 and adjusted to a solids content of 41%.

Characteristic numbers

Solids content 0.5 hours/150° C.=40.7% amine number via solids content=68.3.

1.2 Production of a urethane-modified (meth)acrylic copolymer with an amine number of 30/monomer OH number of 80, wherein the amine number was also introduced via the (meth)acrylic copolymer.

| 1. | 8.572 | parts | PUR macromonomer corresponding to Example 1 |
|---|---|---|---|
| 2. | 3.041 | parts | lauryl acrylate |
| 3. | 10.436 | parts | styrene |
| 4. | 1.500 | parts | hydroxypropl acrylate |
| 5. | 3.781 | parts | butyl methacrylate |
| 6. | 4.634 | parts | isobutyl methacrylate |
| 7. | 4.593 | parts | butanediol monoacrylate |
| 8. | 2.279 | parts | dimethylaminopropyl methacrylate |
| 9. | 1.172 | parts | butyl glycol |
| 10. | 0.390 | parts | 2,2-azobis(2-methylbutane nitrile) |
| 11. | 0.476 | parts | butyl glycol |
| 12. | 0.158 | parts | 2,2-azobis(2-methylbutane nitrile) |
| 13. | 1.75 | parts | ethoxypropanol |
| 14. | 0.968 | parts | DM-propionic acid |
| 15. | 56.25 | parts | deionised water |
| | 100.000 | | |

Item 1 was weighed into a clean, dry reaction vessel with a flat ground joint, which was fitted with a lid, stirrer, thermometer and reflux condenser, and was heated to 125° C. with stirring.

In the meantime, a monomer mixture consisting of items 2 to 8, and an initiator solution consisting of items 9 and 10, were prepared in corresponding mixing vessels.

The monomer mixture comprising items 2–8 and the initiator solution comprising items 9+10 were continuously added over a period of 4 hours at a reaction temperature of 125° C. After the addition was complete, the batch was maintained at 125° C for 1 hour.

In the meantime, an initiator solution consisting of items 11+12 was prepared in a mixing vessel.

In order to obtain a complete conversion, the batch was subsequently initiated twice, as follows: the batch was cooled to 110° C. and the first half of the initiator solution, consisting of items 11 and 12, was added. After the exothermic reaction had occurred, the batch was heated to 125° C. and held for one hour at 125° C.

The batch was then adjusted to a solids content of 80% with item 13.

Item 14 was carefully dispersed into the batch at 125° C.; the batch was held at temperature for 0.5 hours until the acid had dissolved completely, and was then cooled to 95° C. Item 15, which was held at 80° C., was continuously added over a period of 0.5 hours, whereupon the reaction temperature fell to 80° C. After the addition was complete, the batch was stirred for a further 2 hours at 80° C., and was then cooled to <30° C. and filtered.

Final values:
Solids content; 0.5 hours/150° C =35.4%
milliequivalents of acid via solids=23.1
amine number via solids=29.2

2nd Example 2.1 Preparation of a PUR macromonomer with no amine number

| 1. | 5.471 | parts | neopentyl glycol |
|---|---|---|---|
| 2. | 13.288 | parts | of a polyester consisting of hexanediol, adipic acid and isophthalic acid; hydroxyl number 100, acid number < 3 mg KOH/g |
| 3. | 1.788 | parts | hydroxyethyl methacrylate |
| 4. | 2.675 | parts | lauryl alcohol |
| 5. | 0.414 | parts | BHT stabiliser KB |
| 6. | 17.364 | parts | isophorone diisocyanate |
| 7. | 59.000 | parts | ethoxypropanol |
| | 100.000 | | |

Items 1 to 5 were weighed in succession into a clean, dry reaction vessel with a flat ground joint, which was fitted with a lid, stirrer, thermometer and reflux condenser. The mixture was heated to 45°–50° C. with stirring, and was subsequently stirred for a further 1 hour at this temperature to achieve better mixing.

Item 6 had to be added in portions, so that on the onset of an exothermic reaction a maximum product temperature of 85° C. was not exceeded. After the addition was complete, the batch was maintained at a reaction temperature of 80° C. until a determination of the isocyanate groups gave a value<0.3%.

In order to determine the characteristic number, the amino groups present in the resin had to be taken into account in the calculation of the isocyanate group determination according to DIN 53 185. A parallel determination of the amine number according to DIN 53 176 was necessary for this reason.

After the said isocyanate number was reached, the batch was diluted at 80° C. with item 7 and adjusted to a solids content of 41%.

Characteristic numbers

Solids content 0.5 hours/150° C.=41.4% in ethoxypropanol 2.2 Production of a urethane-modified (meth)acrylic copolymer with an amine number of 30/OH number of 80, wherein the amine number was solely introduced via the (meth)acrylic copolymer.

| 1. | 8.591 | parts | PUR macromonomer corresponding to Example 2.1 |
|---|---|---|---|
| 2. | 2.937 | parts | lauryl acrylate |
| 3. | 10.08 | parts | styrene |
| 4. | 1.503 | parts | hydroxypropyl acrylate |
| 5. | 3.652 | parts | butyl methacrylate |
| 6. | 4.476 | parts | isobutyl methacrylate |
| 7. | 4.603 | parts | butanediol monoacrylate |
| 8. | 3.077 | parts | dimethyiaminopropyl methacrylate |
| 9. | 1.175 | parts | butyl glycol |
| 10. | 0.391 | parts | 2,2-azobis(2-methylbutane nitrile) |
| 11. | 0.477 | parts | butyl glycol |
| 12. | 0.159 | parts | 2,2-azobis(2-methylbutane nitrile) |
| 13. | 1.753 | parts | ethoxypropanol |
| 14. | 0.666 | parts | formic acid; 50% solution in deionised water |
| 15. | 56.46 | parts | deionised water |
| | 100.000 | | |

Item 1 was weighed into a clean, dry reaction vessel with a flat ground joint, which was fitted with a lid, stirrer, thermometer and reflux condenser, and was heated to 125° C. with stirring.

In the meantime, a monomer mixture consisting of items 2 to 8, and an initiator solution consisting of items 9 and 10, were prepared in corresponding mixing vessels.

The monomer mixture comprising items 2–8 and the initiator solution comprising items 9+10 were continuously added over a period of 4 hours at a reaction temperature of 125° C. After the addition was complete, the batch was maintained at 125° C. for 1 hour.

In the meantime, an initiator solution consisting of items 11+12 was prepared in a mixing vessel and was stirred until dissolution had occurred.

In order to obtain a complete conversion, the batch was subsequently initiated twice, as follows: the batch was cooled to 110° C. and the first half of the initiator solution, consisting of items 11 and 12, was added. After the exothermic reaction had occurred, the batch was heated to 125° C. and held for one hour at 125° C.

The batch was then adjusted to a solids content of 80% with item 13.

The batch was cooled to 80°–85° C. and item 14 was added, followed by stirring for 0.5 hours at 80°–85° C. Item 15, which was held at 80° C., was continuously added over a period of 0.5 hours, whereupon the reaction temperature fell to 80° C. After the addition was complete, the batch was stirred for a further 2 hours at 80° C., and was then cooled to <30° C. and filtered.

Characteristic numbers:
Solids content; 0.5 hours/150° C.=34.7%
milliequivalents of acid via solids =21.8
amine number via solids =28.7

3rd Example 3.1 Preparation of a PUR macromonomer with an amine number of 70 (corresponding to Example 1 but with a higher solids content)

| 1. | 22.031 | parts | of a polyester consisting of hexanediol, adipic acid and isophthalic acid; hydroxyl number 100, acid number < 3 mg KOH/g |
|---|---|---|---|
| 2. | 10.380 | parts | methyldiethanolamine |
| 3. | 2.964 | parts | hydroxyethyl methacrylate |
| 4. | 4.435 | parts | lauryl alcohol |
| 5. | 0.686 | parts | BHT stabiliser KB |
| 6. | 28.789 | parts | isophorone diisocyanate |
| 7. | 30.715 | parts | ethoxypropanol |
|  | 100.000 |  |  |

Items 1 to 5 were weighed in succession into a clean, dry reaction vessel with a flat ground joint, which was fitted with a lid, stirrer, thermometer and reflux condenser. The mixture was heated to 45°14 50° C. with stirring, and was subsequently stirred for a further 1 hour at this temperature to achieve better mixing.

Item 6 had to be added in portions, so that on the onset of an exothermic reaction a maximum product temperature of 85° C. was not exceeded. After the addition was complete, the batch was maintained at a reaction temperature of 80° C. until a determination of the isocyanate groups gave a value<0.3%.

In order to determine the characteristic number, the amino groups present in the resin had to be taken into account in the calculation of the isocyanate group determination according to DIN 53 185. A parallel determination of the amine number according to DIN 53 176 was necessary for this reason.

After the said isocyanate number was reached, the batch was diluted at 80° C. with item 7 and adjusted to a solids content of 69%.

Characteristic numbers
Solids content 0.5 hours/150° C. =70.2% in ethoxypropanol
amine number via solids content 69.9.

3.2 Production of a urethane-modified (meth)acrylic copolymer, wherein the amine number was solely introduced via PUR macromonomer 3.1 (total amine number with respect to solid resin 30/monomer OH number 80)

| 1. | 20.383 | parts | PUR macromonomer corresponding to Example 3.1 |
|---|---|---|---|
| 2. | 2.198 | parts | lauryl acrylate |
| 3. | 7.545 | parts | styrene |
| 4. | 0.982 | parts | hydroxypropyl acrylate |
| 5. | 2.733 | parts | butyl methacrylate |
| 6. | 3.350 | parts | isobutyl methacrylate |
| 7. | 3.000 | parts | butanediol monoacrylate |
| 8. | 0.768 | parts | butyl glycol |
| 9. | 0.255 | parts | 2,2-azobis(2-methylbutane nitrile) |
| 10. | 0.311 | parts | butyl glycol |
| 11. | 0.104 | parts | 2,2-azobis(2-methylbutane nitrile) |
| 12. | 1.145 | parts | ethoxypropanol |
| 13. | 0.854 | parts | acetic acid; 50% solution in deionised water |
| 14. | 56.372 | parts | deionised water |
|  | 100.000 |  |  |

Item 1 was weighed into a clean, dry reaction vessel with a flat ground joint, which was fitted with a lid, stirrer, thermometer and reflux condenser, and was heated to 125° C. with stirring.

In the meantime, a monomer mixture consisting of items 2 to 7, and an initiator solution consisting of items 8+9, were prepared in corresponding mixing vessels. The monomer mixture comprising items 2–7 and the initiator solution comprising items 8 +9 were continuously added over a period of 4 hours at a reaction temperature of 125° C. After the addition was complete, the batch was maintained at 125° C. for 1 hour.

In the meantime, an initiator solution consisting of items 10+11 was prepared in a mixing vessel and was stirred until dissolution was complete.

In order to obtain a complete conversion, the batch was subsequently initiated twice, as follows: the batch was cooled to 110° C. and the first half of the initiator solution, consisting of items 10 and 11, was added. After the exothermic reaction had occurred, the batch was heated to 125° C. and held for one hour at 125° C.

The batch was then adjusted to a solids content of 80% with item 12.

The batch was cooled to 80°–85° C. and item 13 was added, followed by stirring for 0.5 hours at 80°–85° C. Item 14, which was held at 80° C., was continuously added over a period of 0.5 hours, whereupon the reaction temperature fell to 80° C. After the addition was complete, the batch was stirred for a further 2 hours at 80° C., and was then cooled to <30° C. and filtered.

Characteristic numbers:
Solids content; 0.5 hours/150° C.=35.0%
milliequivalents of acid via solids 21.0
amine number via solids=29.4

4th Example

Production of aqueous base lacquers from modular components according to WO-A-95/29960

4.1 Production of a binder vehicle module comprising the binder vehicles according to the invention The following binder vehicles were well mixed with each other with stirring:

| | |
|---|---|
| 172.0 g | of a cationically modified acrylated polyurethane binder vehicle (produced by emulsion polymerisation) corresponding to WO-A-95129960, preparation example 5 |
| 28.5 g | of a cationically modified polyurethane binder vehicle corresponding to WO-A-95/29960, preparation example 3 |
| 135.1 g | of a binder vehicle according to the invention, corresponding to Example 1 |
| 30.0 g | deionised water |

4.1 Production of a binder vehicle module comprising comparative binder vehicles The following binder vehicles were well mixed with each other with stirring:

| | |
|---|---|
| 172.0 g | of a cationically modified acrylated polyurethane binder vehicle (produced by emulsion polymerisation) corresponding to WO-A-95/29960, preparation example 5 |
| 28.5 g | of a cationically modified polyurethane binder vehicle corresponding to WO-A-95129960, preparation example 3 |
| 234.5 g | of an aminoacrylate binder corresponding to WO-A-95129960, preparation example 1 |
| 30.0 g | deionised water |

4.2 Production of an effect module

The following constituents were mixed with each other:

| | |
|---|---|
| 8.4 g | of a commercially available aluminium paste containing 65% aluminium, suitable for aqueous base lacquer |
| 0.8 g | of an aluminium wetting additive based on organic derivatives of phosphoric acid |
| 4.9 g | butyl glycol |
| 2.0 g | N-methylpyrrolidone |
| 4.5 g | n-butanol |
| 8.0 g | of a cationically modified PUR-acrylic binder vehicle corresponding WO-A/95/29960, preparation example 5 |

4.3 Production of a rheology module

A rheology module was produced corresponding to WO-A-95/29960 (rheology module I).

The individual modules were mixed with each other corresponding to the quantitative data in the following Table.

| | Aqueous base lacquer according to the invention | Comparative aqueous base lacquer |
|---|---|---|
| Binder vehicle module according the invention | 68.9 parts | |
| Comparative binder vehicle module | | 68.9 parts |
| Effect module | 15.0 parts | 15.0 parts |
| Rheology module | 8.5 parts | 8.5 parts |

A comparison of the lacquer technology properties is given in the following Table.

| | Aqueous base lacquer according to the invention | Comparative aqueous base lacquer |
|---|---|---|
| Metallic effect | 1–2 | 3 |
| Adhesion (cross-cut adhesion test) | 1 | 2 |
| Stability on storage | Separation after 6 months | Separation after 2 months |

1 - very good
2 - good
3 - satisfactory

I claim:

1. A water-thinnable dispersion of one or more cationically modified and urethane-modified (meth)acrylic copolymers, which are obtained by the solution free radical polymerization of
   A) one or more unsaturated (meth)acrylic monomers which are free of cationic groups or groups which can be converted into cationic groups, in the presence of
   B) one or more polyurethane macromonomers containing unsaturated groups wherein the polyurethane macromonomer is obtained by the reaction of
      b1) one or more mono- and/or polyhydroxyl compounds, which optionally contain one or more polymerizable double bonds, with
      b2) one or more polyisocyanates,
      b3) with a compound which contains, in its molecule, at least one group which is reactive towards isocyanate groups and at least one group which is capable of forming cations,
      b4) with a compound which contains a polymerizable double bond and contains at least one group which is reactive towards NCO groups, and
      b5) optionally with a compound which contains a group which is reactive towards isocyanate groups and contains a linear or branched (cyclo)aliphatic hydrocarbon radical containing 5 to 20 C atoms, or with a mixture of such compounds,
   wherein polymerizable double bonds are introduced into the polyurethane macromonomer by at least one of components b1) and b4), components b1) to b5) are selected so that a polyurethane macromonomer is formed which contains terminal and/or lateral unsaturated groups and the cationic groups or groups which can be converted into cationic groups of the urethane-modified (meth)acrylic copolymer are introduced via polyurethane macromonomer B), and subsequent conversion of the reaction product into the aqueous phase, wherein the cationic groups or groups which can be converted into cationic groups which are contained in the reaction product are at least partially neutralised before or during the conversion into the aqueous phase.

2. A dispersion according to claim 1, wherein 60 to 95% by weight of monomers which are polymerisable by a radical mechanism are polymerised in the presence of 5 to 4% by weight of polyurethane macromonomer, wherein the sum of the constituents amounts to 100% with respect to the solids content in each case.

3. A dispersion according to claim 1 wherein hydroxyethyl (meth)acrylate, hydroxypropyl (meth)acrylate and/or hydroxybutyl (meth)acrylate are used as component a1).

4. A dispersion according to any one of claim 1 wherein polyurethane macromonomer comprising B) has a number average molecular weight Mn of 2000 to 20,000, contains, as a statistical average, 0.2 to 1.5 polymerisable double bonds per molecule, and has an amine number of 0 to 100 mg KOH/g.

5. A process for producting a water-thinnable dispersion of one or more cationically modified and urethane-modified (meth)acrylic copolymers, comprising:

A) one or more unsaturated (meth)acrylic monomers which are free of cationic groups or groups which can be converted into cationic groups, are polymerized by solution free radical polymerization, in the presence of B) one or more polyurethane macromonomers containing unsaturated groups wherein the polyurethane macromonomer is obtained by the reaction of b1) one or more mono- and/or polyhydroxyl compounds, which optionally contain one or more polymerizable double bonds, with b2) one or more polyisocyanates, b3) with a compound which contains, in its molecule, at least one group which is reactive towards isocyanate groups and at least one group which is capable of forming cations, b4) with a compound which contains a polymerizable double bond and contains at least one group which is reactive towards NCO groups, and b5) optionally with a compound which contains a group which is reactive towards isocyanate groups and contains a linear or branched (cyclo)aliphatic hydrocarbon radical containing 5 to 20 C atoms, or with a mixture of such compounds, wherein polymerizable double bonds are introduced into the polyurethane macromonomer by at least one of components b1) and b4), components b1) to b5) are selected so that a polyurethane macromonomer is formed which contains terminal and/or lateral unsaturated groups and the cationic groups or groups which can be converted into cationic groups of the urethane-modified (meth)acrylic copolymer are introduced via polyurethane macromonomer B), and wherein the reaction product is subsequently converted into the aqueous phase, wherein the cationic groups or groups which can be converted into cationic groups which are contained in the reaction product are at least partially neutralised before or during the conversion into the aqueous phase.

6. Water-thinnable coating media containing the dispersion according to claim 1, water, and optionally organic solvents, pigments and/or extenders, as well as customary lacquer additives.

7. A process for producing a multi-layer coating by the application of a base coat comprising an aqueous coating medium to a substrate, which is optionally precoated, and the subsequent application of a transparent outer coat, characterised in that a coating medium according to claim 6 is used as the aqueous coating medium for the base coat.

* * * * *

UNITED STATES PATENT AND TRADEMARK OFFICE
CERTIFICATE OF CORRECTION

PATENT NO.: 5,854,329

DATED: December 29, 1998

INVENTOR(S): Bettina Vogt-Birnbrich and Armin Göbel

It is certified that error appears in the above-identified patent and that said Letters Patent is hereby corrected as shown below:

In column 1, line 34, please delete "the" before "these".

In column 16, line 62, please delete "any one of" before "claim".

Signed and Sealed this

Nineteenth Day of December, 2000

Attest:

Q. TODD DICKINSON

Attesting Officer

Commissioner of Patents and Trademarks